United States Patent Office 3,637,734
Patented Jan. 25, 1972

3,637,734
BENZIMIDAZOLYLFURAN COMPOUNDS
Horst Harnisch, Cologne, Buchheim, and Roderich Raue, Leverkusen-Wiesdorf, Germany, assignors to Farbenfabriken Bayer Aktiengesellschaft, Leverkusen, Germany
No Drawing. Continuation of application Ser. No. 517,062, Dec. 28, 1965. This application June 17, 1969, Ser. No. 838,011
Claims priority, application Germany, Dec. 31, 1964, F 44,856; Aug. 4, 1965, F 46,812
Int. Cl. C07d 49/38, 85/48
U.S. Cl. 260—309.2                          1 Claim

ABSTRACT OF THE DISCLOSURE

Optical brightening composition and method of brightening synthetic materials such as polyacrylonitrile and polyamides by applying as active component a compound of the formula:

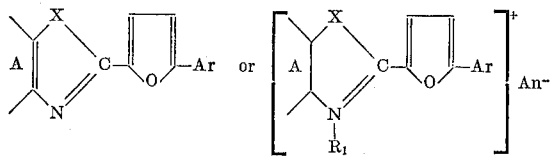

wherein

A is a residual member of an aromatic ring system condensed with the heterocyclic ring;
X is

wherein R stands for a member selected from the group consisting of hydrogen, alkyl, chloroalkyl, cyanoalkyl, alkenyl, cycloalkyl and aralkyl;
Ar is an aromatic radical;
$R_1$ is a member selected from the group consisting of an alkyl, alkenyl, cycloalkyl and aralkyl radical; and
$An^-$ is an anion.

---

This application is a continuation of application Ser. No. 517,062 filed Dec. 28, 1965 and now abandoned.

The present invention relates to brightening agents; more particularly it concerns brightening agents which consist essentially of fluorescing, practically colourless compounds of the formula

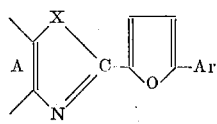

wherein A denotes the residual members of an aromatic ring system condensed with the heterocyclic ring in the manner indicated above and X represents oxygen or the grouping

where R stands for hydrogen or an alkyl, alkenyl, cycloalkyl or aralkyl group which may optionally be substituted, for instance by halogen or a cyano group, whilst Ar represents an aromatic radical, or of the quaternization products of these compounds corresponding to the formula

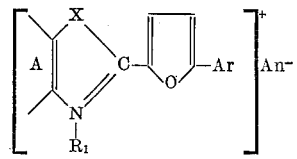

wherein A, X and Ar have the above specified significance whilst $R_1$ represents an alkyl, alkenyl, cycloalkyl or aralkyl radical which may optionally be substituted, for instance by halogen or a cyano group, and $An^-$ denotes an anion.

The aromatic and heterocyclic rings contained in the general Formulae I and II may contain substituents other than a nitro group, for instance alkyl, cycloalkyl, aralkyl or aryl radicals, halogen, cyano, hydroxy, alkoxy, aralkoxy or aryloxy groups, carboxyl groups which may also be esterified, or carboxylamide or sulphonamide groups which may also be substituted by alkyl, aralkyl or aryl radicals, furthermore alkylsulfonyl or arylsulfonyl groups as well as acyloxy or carbamoyloxy groups and the radicals —NHCO-alkyl, —NHCO-aryl, —NCONH-alkyl, —NHCONH-aryl, —NHY or

wherein Y denotes a heterocyclic radical, for instance the 1,3,5-triazinyl radical, whilst Z represents the residual members of a heterocyclic ring, for instance the grouping

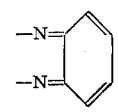

The compounds of the above mentioned Formulae I and II are suitable for brightening natural fibre materials from wool and cellulose and especially for brightening fibres, sheets, films or bulk products of synthetic origin, for instance of cellulose esters, polyamides, polyurethanes, polyesters, polyvinylchloride, polyvinylacetate or polystyrene and in particular for brightening shaped products from polymers containing acrylonitrile, this being especially applicable to the quaternization products of the Formula II.

The compounds of the Formula I can be obtained according to various procedures. One of the procedures consists in condensing a furan-2-carboxylic acid having an optionally substituted aryl radical at its 5-position, or its functional derivatives, such as its esters or acid chlorides, with a primary arylamine having a hydroxyl group or an amino group with at least one hydrogen atom in the position adjacent to the amino group, optionally in the presence of inert organic solvents, such as dichlorobenzene, trichlorobenzene, xylene, p-cymene, dimethylformamide, propylene glycol, ethylene glycol monoethylether or ethylene glycol diethylether, and preferably in the presence of catalysts, for instance boric acid, zinc chloride, polyphosphoric acid or p-toluylsulfonic acid.

The following may be mentioned as examples of the furan-2-carboxylic acids:

5-phenylfuran-2-carboxylic acid,
5(4'-chlorophenyl)-furan-2-carboxylic acid,
5(4'-bromophenyl)-furan-2-carboxylic acid,
5(2',4'-dichlorophenyl)-furan-2-carboxylic acid,
5(3',4'-dichlorophenyl)-furan-2-carboxylic acid,
5(4'-methylphenyl)-furan-2-carboxylic acid,
5(4'-ethylphenyl)-furan-2-carboxylic acid,
5(4'-methoxyphenyl)-furan-2-carboxylic acid,
5(4'-acetoxyphenyl)-furan-2-carboxylic acid,
5(4'-diphenylyl)-furan-2-carboxylic acid, 5(3'-cyanophenyl)-furan-2-carboxylic acid,
5(4'-cyanophenyl)-furan-2-carboxylic acid,
5(4'-methylsulfonylphenyl)-furan-2-carboxylic acid and
5(4'-acetylaminophenyl)-furan-2-carboxylic acid.

The 5-arylfuran-2-carboxylic acids are available by the reaction of diazotised arylamines with furan-2-carboxylic acid in the presence of cupric chloride according to Chem. Abstr. 48, 1935 (1954).

The following may be mentioned as examples of suitable primary arylamines:

1,2-phenylene-diamine;
1,2-diamino-4-chlorobenzene;
1,2-diamino-4-methylbenzene;
1,2-diamino-4-methoxybenzene;
1,2-naphthylene-diamine;
1-amino-2-methylamino-benzene;
1-amino-2-ethylamino-benzene;
1-amino-2-(β-cyano-ethylamino)-benzene;
1-amino-2-(β-chloroethylamino)-benzene;
1-amino-2-benzylamino-benzene;
1-amino-2-methylamino-5-methylbenzene,
1-amino-2-hydroxy-benzene;
1-amino-2-hydroxy-4-methylbenzene;
1-amino-2-hydroxy-5-methylbenzene;
1-amino-2-hydroxy-5-methoxybenzene;
1-amino-2-hydroxy-3,5-dimethylbenzene;
1-amino-2-hydroxy-5-tert.butylbenzene;
1-amino-2-hydroxy-5-chlorobenzene;
1-amino-2-hydroxy-3,5-dichlorobenzene;
1-amino-2-hydroxy-naphthalene and
2-amino-3-hydroxy-naphthalene.

Another procedure for the production of the compounds of the Formula I consists in condensing a furan-2-aldehyde having an optionally substituted aryl radical at its 5-position with a primary arylamine having a hydroxyl group or an amino group with at least one hydrogen atom in the position adjacent to the amino group to form an azomethine of the formula

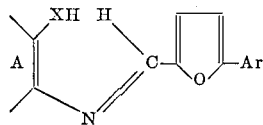

(III)

wherein A, X and Ar have the significance specified before, and converting it to the corresponding benzimidazoles or benzoxazoles of the Formula I.

The following may be mentioned as examples of 5-aryl-furan-2-aldehydes:

5-phenyl-furan-2-aldehyde,
5(4'-chlorophenyl)-furan-2-aldehyde,
5(4'-bromophenyl)-furan-2-aldehyde,
5(2',4'-dichlorophenyl)-furan-2-aldehyde,
5(3',4'-dichlorophenyl)-furan-2-aldehyde,
5(4'-methylphenyl)-furan-2-aldehyde,
5(4'-ethylphenyl)-furan-2-aldehyde,
5(4'-methoxyphenyl)-furan-2-aldehyde,
5(4'-acetoxyphenyl)-furan-2-aldehyde,
5(4'-diphenylyl)-furan-2-aldehyde,
5(3'-cyanophenyl)-furan-2-aldehyde,
5(4'-cyanophenyl)-furan-2-aldehyde,
5(4'-methylsulphonylphenyl)-furan-2-aldehyde,
5(4'-carboxyphenyl)-furan-2-aldehyde,
5(4'-carbomethoxy-phenyl)-furan-2-aldehyde,
5(4'-carboethoxy-phenyl)-furan-2-aldehyde,
5(4'-carbamoyl-phenyl)-furan-2-aldehyde,
5(4'-acetylamino-phenyl)-furan-2-aldehyde and
5(4'-aminosulfonylphenyl)-furan-2-aldehyde.

These 5-aryl-furan-2-aldehydes are obtainable by reacting diazotised arylamines with furan-2-aldehydes in the presence of cupric chloride according to Chem. Abstr. 48, 1935 (1954); 5-alkoxyphenyl and 5-acylaminophenyl-furan-2-aldehydes can be prepared from the corresponding nitro compounds by known methods.

As primary aryl amines for the reaction with the 5-aryl-furan-2-aldehydes the same compounds may be used which are mentioned before as suitable for the reaction with 5-aryl-furan-2-carboxylic acids, furthermore compounds such as 1-amino-2-hydroxy-5-carboxy-benzene and 1-amino-2-methylamino-5-carbomethoxy-benzene.

The condensation of the 5-aryl-furan-2-aldehydes with the primary arylamines to form the azomethines of the Formula III is conveniently carried out at a temperature between 30 and 200° C., preferably at 60–120° C.; it is in general advisable to carry out the condensation in a solvent and diluent such as methanol, ethanol, acetone, acetonitrile, glacial acetic acid, ethyl acetate, dioxan, tetrahydrofuran, dimethylformamide, benzene, toluene, xylene, chlorobenzene, o-dichlorobenzene, chloroform or carbon tetrachloride.

The conversion of the azomethines of the Formula III to the corresponding benzimidazoles or benzoxazoles of the Formula I is carried out with agents having an oxidising effect according to methods known per se. It is thus possible to obtain the benzimidazole compounds by means of oxidation with nitrobenzene at an elevated temperature, preferably at the boiling point, or with cupric acetate in methanol (Ann. 575, 162 (1952)), whereas the benzoxazole compounds are obtained by means of oxidation with lead tetraacetate in glacial acetic acid or benzene (J. Chem. Soc. 1949, 2971) or with chloranil in xylene (J. Chem. Soc. 1950, 1722). Other suitable oxidising agents are oxygen, manganese dioxide, sulphuryl chloride, benzoyl peroxide, N-bromosuccinimide and sodium hypochlorite; further suitable solvents are acetone, alcohol, dioxan, tetrahydrofuran, dimethylformamide, toluene, cholorobenzene, o-dichlorobenzene, chloroform and carbon tetrachloride.

The compounds of the Formula II indicated before can be obtained by treating the compounds of the Formula I with quaternizing agents, for instance with dimethyl sulphate, diethyl sulphate, methyl iodide, ethyl chloride, butyl bromide, allyl bromide, benzyl chloride, 4-methoxybenzyl chloride, 4-chlorobenzyl chloride, p-toluene-sulphonic acid methyl ester and p-toluene-sulphonic acid ethyl ester, conveniently in the presence of inert organic solvents such as dioxan, acetone, chloroform, chlorobenzene, dichlorobenzene, toluene or xylene.

Compounds of the Formulae I or II can be obtained from the 5-aryl-furan-2-aldehydes and the primary aryl amines also when one of the components or both contain a nitro group, provided that the nitro groups in the benzimidazole or benzoxazole compounds or in the quaternization products are reduced to amino groups; it is advisable to acylate the amino groups subsequently. The following may be mentioned as examples of nitro group-containing 5-aryl-furan-2-aldehydes and nitro group-containing primary aryl amines: 5(4'-nitrophenyl)-furan-2-aldehyde, 1,2 - diamino-4-nitrobenzene and 1-amino-2-hydroxy-5-nitrobenzene.

Benzimidazole compounds of the Formula I wherein X represents the grouping

and R stands for an alkyl, alkenyl, cycloalkyl or aralkyl group which may optionally be substituted can be obtained from benzimidazole compounds of the Formula I wherein X represents —NH— by reacting these compounds with alkylating agents such as dimethyl sulphate, diethyl sulfate, methyl iodide, ethyl chloride, butyl bromide, allyl bromide, benzyl chloride, 4-methoxybenzyl chloride, 4-chlorobenzyl chloride, p-toluene-sulphonic acid methyl ether and p-toluene-sulphonic acid ethyl ester, and treating the reaction products subsequently with alkaline reacting agents, for instance with sodium hydroxide, sodium carbonate or potassium carbonate.

When using compounds of the type of ethylene oxide or acrylonitrile as alkylating agents, it is advisable to carry out the reaction in the presence of basic catalysts such as triethyl amine, N,N,N',N'-tetramethyl-1,2-diamino ethane, N,N,N',N'-tetramethyl-1,2-diamino butane, 1,4-diaza-bicyclo(2,2,2)octane and tetramethyl guanidine.

The brightening agents of the present invention can be applied by the usual methods, for instance in the form of their solutions in water or in organic solvents, or in the form of their aqueous dispersions, when oleylpolyglycol ethers or condensation products from naphthalenesulphonic acids and formaldehyde may inter alia be employed as the dispersing agents. The brightening agents can also be employed in mixture with detergents. They may also be added to spinning and casting compositions which serve for the production of artificial fibres, threads, sheets and other shaped products.

The brightening agents of the present invention have a very high efficiency; in addition they are very resistant to light and also resistant to bleach liquors containing alkali metal chlorites. These favorable properties are not exhibited to the same extent by the benzimidazole and benzoxazole compounds hitherto proposed for brightening purposes.

The following examples serve to illustrate the invention without, however limiting its scope; the parts given are parts by weight.

EXAMPLE 1

Polyacrylonitrile fibres are introduced at liquor-to-goods ratio of 40:1 into an aqueous liquor which contains, per litre, 1 g. of a commercial surface-active paraffin-sulphonate, 0.75 g. formic acid and 0.125 g. 2(benzimidazolyl-(2')) - 5(4' - chlorophenyl)-furan as brightening agent. The treatment liquor is heated to boiling during 20-30 minutes and maintained at the boiling temperature for 30-60 minutes. The polyacrylonitrile fibres are finally rinsed and dried. They exhibit a very good brightening effect.

The 2(benzimidazolyl-(2'))-5(4'-chlorophenyl)-furan was prepared as follows:

22.3 parts 5(4'-chlorophenyl)-furan-2-carboxylic acid, 38 parts 1,2-phenylene-diamine and 0.5 part boric acid were intimately mixed, the mixture was melted in a current of nitrogen and stirred at 215-220° C. for 45 minutes, a part of the liberated water distilling off and some of the 1,2-phenylenediamine subliming. The melt was thereafter cooled down to 90° C. in a current of nitrogen and stirred with 220 parts of 12% hydrochloric acid, the reaction product which had not dissolved was filtered off, then washed four times with portions, each of 40 parts, of 12% hydrochloric acid, then with 30 parts water as well as with 120 parts of 10% ammonium hydroxide solution, and finally with another 100 parts water. The residue was thereafter dried in vacuo at 80° C. 23 parts of 2(benzimidazolyl-(2'))-5(4'-chlorophenyl)-furan were obtained, having a melting point of 259-261° C. after recrystallisation from chlorobenzene.

Very good brightening effects are also obtained when instead of 2(benzimidazolyl-(2'))-5(4'-chlorophenyl)-furan one of the following compounds of the Formula I obtainable by an analogous method is applied as brightening agent:

2(1'-β-cyanoethyl - benzimidazolyl - (2'))-5(4'-chlorophenyl)-furan (M.P. 185-186° C.), 2(5'-methyl-benzimidazolyl-(2'))-5(4'-chlorophenyl)-furan (M.P. 218-220° C.) and 2(1',5'-dimethyl-benzimidazolyl-(2'))-5(4'-chlorophenyl)-furan (M.P. 186-187° C.)

EXAMPLE 2

Polyacrylonitrile fibres are introduced at a liquor-to-goods ratio of 40:1 into an aqueous liquor which contains, per litre, 1 g. oxalic acid, 1 g. sodium chlorite as well as 0.125 g. 5(4'-chlorophenyl)-furan-2(1',3'-dimethylbenzimidazolium-(2'))-methosulfate as brightening agent. The liquor is heated to boiling during 20 minutes and maintained at the boiling temperature for 45-60 minutes. The polyacrylonitrile fibres are thereafter rinsed and dried. An excellent brightening effect is thereby achieved on the fibres.

The brightening agent applied was prepared in the following manner:

29 parts 2(benzimidazolyl-(2'))-5(4'-chlorophenyl)-furan whose preparation has been described in Example 1, were dissolved in 770 parts of boiling chlorobenzene whilst stirring and condensing under reflux, the solution was treated with 4 parts of powdered magnesium oxide and treated dropwise with 26 parts dimethyl sulphate, and it was thereafter stirred under reflux for another 5 hours. The reaction mixture was then cooled, the separated quaternary salt was filtered off with suction, washed repeatedly with chlorobenzene and benzine and dried in vacuo at 70° C. before being recrystallised from water with the addition of hydrochloric acid and ethanol. 18 parts of 5(4'-chlorophenyl) - furan - 2(1',3'-dimethylbenzimidazolium-(2'))-methosulfate were obtained.

Excellent brightening effects are also obtained when instead of the above described brightening agent one of the following quaternization products of the Formula II prepared by an analogous method, is applied:

5(4'-methoxyphenyl)-furan-2(1',3'-dimethylbenzimidazolium-(2'))-methosulphate,
5(3',4'-dichlorophenyl)-furan-2(1'-methyl-3'-ethylbenzimidazolium-(2'))-chloride,
5(4'-methylphenyl)-furan-2(1',3',5'-trimethylbenzimidazolium-(2'))-methosulphate,
5(4'-chlorophenyl)-furan-2(1',3',5'-trimethylbenzimidazolium-(2'))-chloride and
5(4'-methoxyphenyl)-furan-2(1',3'-dimethyl-5'-chlorobenzimidazolium-(2'))-chloride.

EXAMPLE 3

Polyacrylonitrile fibres are introduced at a liquor-to-goods ratio of 40:1 into an aqueous liquor which contains, per litre, 1 g. of a commercial surface active paraffin-sulphonate, 0.75 g. formic acid and 0.125 g. 2(benzoxazolyl - (2'))-5(4'-chlorophenyl) - furan as brightening agent. The treatment liquor is heated to boiling during 20-30 minutes and maintained at the boiling temperature for 30-60 minutes. The polyacrylonitrile fibres are subsequently rinsed and dried. They exhibit a good brightening effect.

The employed 2(benzoxazolyl-(2'))-5(4'-chlorophenyl)-furan was prepared as follows:

22.3 parts 5(4'-chlorophenyl)-furan-2-carboxylic acid, 33 parts 2-aminophenol and 0.5 part boric acid were intimately mixed, the mixture was melted in a current of nitrogen and stirred at 240-250° C. for 45 minutes. The melt was thereafter cooled down to 150° C. in a current of nitrogen and treated with 100 parts dimethylformamide and 1000 parts water, whilst stirring. The resultant precipitate was filtered off, stirred with 200 parts of 12% hydrochloric acid in order to separate the excess of 2-aminophenol, then filtered again and washed, first of all four times with portions, each of 40 parts, of 12% hydrochloric acid, then with water, then with 10% ammonium hydroxide solution and finally again with water. After drying in vacuo at 50° C. 16 parts of 2(benzoxazolyl-(2'))-5(4'-chlorophenyl)-furan were obtained which had a melting point of 166-167° C. after recrystallising twice from alcohol.

Good brightening effects are also obtained when instead of 2(benzoxazolyl-(2'))-5(4'-chlorophenyl)-furan one of the following compounds of the Formula I obtained by an analogous method is applied as brightening agent: 2(5'-methylbenzoxazolyl - (2'))-5(4'-methylphenyl) - furan (M.P. 136-138° C.) or 2(5'-methylbenzoxazolyl-(2'))-5(4'-methylsulphonylphenyl)-furan (M.P. 224.5-225° C.).

EXAMPLE 4

Polyacrylonitrile fibres are introduced at a liquor-to-goods ratio of 40:1 into an aqueous liquor which contains, per litre, 1 g. oxalic acid, 1 g. sodium chlorite and 5(3',4'-dichlorophenyl) - furan - 2(1',3'-dimethylbenzimidazolium-(2'))-methosulphate as brightening agent. The liquor is heated to boiling during 20 minutes and is maintained at the boiling temperature for 50 minutes. The polyacrylonitrile fibres are subsequently rinsed and dried. An excellent brightening effect is thereby achieved on the fibres.

The brightening agent applied was prepared in the following manner:

25.7 parts 5(3',4'-dichlorophenyl)-furan-2-carboxylic acid (M.P. 228–230° C.) and 12.5 parts 1-amino-2-methylamino-benzene and were heated to 240° C. in a weak current of nitrogen whilst stirring in the presence of 0.5 part boric acid and stirred at this temperature for a further 45 minutes in a nitrogen atmosphere while simultaneously distilling off part of the water formed. The reaction mixture was subsequently cooled in a nitrogen stream to 170° C. while stirring, mixed with 80 parts of dimethyl formamide and then cooled to room temperature while stirring. The resulting precipitate was filtered off, washed with cold methanol and dried in vacuo at 80° C. 10 parts of the resulting 19 parts of 2(1'-methyl-benzimidazolyl-(2'))-5(3',4'-dichlorophenyl) - furan of melting point 196.5–198° C. were dissolved in 100 parts of dioxane with heating, the boiling solution was reacted dropwise with 4.5 parts dimethylsulphate while cooling under reflux and stirring, stirred at boiling temperature for a further 30 minutes under reflux and then cooled. The resulting precipitate was filtered off, washed with ethyl acetate and dried in vacuo at 80° C. 15 parts of the above-said brightening agent of melting point 205–209° C. were obtained (from water).

Excellent brightening effects on polyacrylonitrile fibres are also obtained when, instead of 5(3',4'-dichlorophenyl)-furan-2(1',3'-dimethylbenzimidazolium - (2'))-methosulphate, one of the following compounds of the Formula II is applied which were prepared as follows:

(a) 10 parts 2(1'-methyl-benzimidazolyl-(2'))-5(3',4'-dichlorophenyl)-furan were heated to 130° C. under reflux while stirring with 40 parts benzyl chloride for 30 minutes; thereafter the reaction mixture was cooled, the precipitate formed was filtered off, washed with ethyl acetate and dried at 80° C. in vacuo. 9 parts 5(3',4'-dichlorophenyl) - furan - 2(1'-methyl-3'-benzyl-benzimidazolium-(2'))-chloride of melting point 209–211° C. were obtained.

(b) 10 parts 2(1' - methyl-benzimidazolyl-(2'))-5(3',4'-dichlorophenyl)-furan were heated with 8 parts p-toluene-sulphonic acid ethyl ester in 50 parts 1,2-dichlorobenzene for 3 hours under reflux. Thereafter the reaction mixture was cooled, the precipitate formed was filtered off, washed with benzene and dried at 80° C. in vacuo. 14 parts 5(3',4'-dichlorophenyl)-furan-2(1'-methyl-3'-ethylbenzimidazolium - (2')) - tosylate of melting point 234–235° C. were obtained.

(c) 10 parts 2(1' - methyl-benzimidazolyl-(2'))-5(3',4'-dichlorophenyl)-furan were heated to 150–160° C. with 4.5 parts n-butyl bromide in 50 parts chlorobenzene for 4 hours in a closed reaction vessel. Thereafter the reaction mixture was cooled, the precipitate formed was filtered off, washed with benzene and dried at 80° C. in vacuo. 8 parts 5(3',4'-dichlorophenyl)-furan-2(1'-methyl-3'-n-butylbenzimidazolium - (2')) - bromide of melting point 252–256° C. were obtained.

(d) 10 parts 2(1' - methyl-benzimidazolyl-(2'))-5(3',4'-dichlorophenyl)-furan were heated to 150–160° C. with 5 parts allyl bromide in 50 parts chlorobenzene for 4 hours in a closed reaction vessel. Thereafter the reaction mixture was cooled, the precipitate formed was filtered off, washed with benzene and dried at 80° C. in vacuo. 7.5 parts 5(3',4'-dichlorophenyl)-furan-2(1'-methyl-3'-allylbenzimidazolium - (2')) - bromide of melting point 255–257° C. were obtained.

EXAMPLE 5

Polyester fibres from terephthalic acid and glycol are introduced at a liquor-to-goods ratio of 40:1 into an aqueous liquor which contains, per litre, 1 g. sodium oleylsulfate, 0.75 g. formic acid and 0.1 g. 2(5'-methyl-benzoxazolyl-(2')) - 5(3',4' - dichlorophenyl)-furan as brightening agent. The treatment liquor is heated to boiling and maintained at the boiling temperature for 50 minutes. The fibres are then rinsed and dried; they exhibit a very good brightening effect.

The brightening agent employed was prepared in the following manner:

25.7 parts 5(3',4' - dichlorophenyl)-furan-2-carboxylic acid, 15 parts 1-amino-2-hydroxy-5-methylbenzene and 0.5 part boric acid were heated to 250° C. while stirring in a current of nitrogen and stirred for a further 45 minutes at this temperature in a current of nitrogen while simultaneously distilling off part of the water formed. Subsequently the reaction mixture was cooled down to 170° C. in a current of nitrogen whilst stirring, then mixed with 80 parts dimethylformamide whilst stirring and after cooling to 90° C. mixed with 100 parts methanol. After stirring for several hours at room temperature the crystalline precipitate formed was filtered off, washed with cold methanol and dried at 80° C. in vacuo. The yield was 21 parts which melted at 165–167° C. (from ethanol-dimethylformamide).

A very good brightening effect on polyester fibres can also be obtained when the above mentioned benzoxazole compound is replaced by 2(5'-methyl-benzoxazolyl-(2'))-5(4'-methylsulfonylphenyl)-furan of melting point 224–225° C.; this compound is obtainable in analogous manner from 5(4' - methylsulfonylphenyl-(2'))-furan-2-carboxylic acid and 1-amino-2-hydroxy-5-methylbenzene.

The 2(5' - methyl-benzoxazolyl-(2'))-5(3',4'-dichlorophenyl)-furan applied as brightening agent could also be produced in the following manner:

24.1 parts 5(3',4'-dichlorophenyl)-furan - 2 - aldehyde (M.P. 136–137° C.) were heated to boiling under reflux for 15 minutes with 12.3 parts 1-amino - 2 - hydroxy-5-methylbenzene in 100 parts ethanol. The reaction mixture was then cooled and the crystalline precipitate was filtered off, washed with cold methanol and dried in vacuo. 10 parts of the 30.5 parts of azomethine (M.P. 158–159° C.) thus obtained were heated to boiling under reflux for 6 hours with 7.2 parts chloranil in 50 parts xylene. The reaction mixture was cooled and the crystalline precipitate was filtered off, washed with cold methanol and dried in vacuo at 80° C. 9.2 parts 2(5'-methyl-benzoxazolyl-(2'))-5(3',4'-dichlorophenyl) - furan were obtained which melted at 166–167° C. (from ethanol).

EXAMPLE 6

Polyamide fibres from ε-caprolactam are treated at a liquor-to-goods ratio of 40:1 in an aqueous liquor at 60° C. for 30 minutes which contains per litre 1 g. sodium oleyl sulfate and 0.165 g. 2(5'-methyl-benzoxazolyl-(2'))-5(4'-methylphenyl)-furan as brightening agent. Thereafter the fibres are rinsed and dried; they exhibit a good brightening effect.

The brightening agent was prepared in the following manner:

20.2 parts 5(4'-methylphenyl)-furan-2-carboxylic acid (M.P. 175–177° C.) were condensed with 30 parts 1-amino-2-hydroxy-5-methylbenzene in the presence of 0.5 part boric acid and then worked up under the same conditions as indicated in Example 3 for the preparation of 2(benzoxazolyl-(2')) - 5(4' - chlorophenyl)-furan. The yield amounted to 17 parts having a melting point of 136–138° C. (from ethanol).

EXAMPLE 7

A stock solution is prepared from 10 parts polyacrylonitrile, 80 parts dimethylformamide and 10 parts of one of the brightening agents of the Formula II described in Examples 2 and 4, and this solution is added to one of the usual polyacrylonitrile spinning solutions at a proportion so that the concentration of the brightening agent in the spun polyacrylonitrile material amounts to 0.25 percent by weight. The spinning solution is then spun as usual and the resultant fibres are bleached in a liquor containing sodium chlorite. An excellent brightening effect is thereby achieved.

EXAMPLE 8

Polyacrylonitrile fibres are introduced at a liquor-to-goods ratio of 40:1 into an aqueous liquor which contains, per litre, 1 g. of a commercial surface-active oleyl polyglycol ether, 1 g. oxalic acid, 1 g. sodium chlorite and 0.1 g. 2(1'-β-cyanoethyl-benzimidazolyl-(2'))-5(4'-chlorophenyl)-furan as brightening agent. The treatment liquor is heated to boiling during 20 minutes and maintained at the boiling temperature for 1 hour. Thereafter the fibres are rinsed and dried; they exhibit a very good brightening effect.

The 2(1'-β-cyanoethyl-benzimidazolyl - (2')) - 5(4'-chlorophenyl)-furan was prepared in the following manner:

9 parts 2(benzimidazolyl-(2')) - 5(4'-chlorophenyl)-furan, prepared as described in Example 1, were heated to boiling temperature with 60 parts acrylonitrile and 6 parts N,N,N',N'-tetramethyl-1,2-diaminoethane during 1 hour whilst stirring and kept at boiling temperature for about 20 hours with stirring under reflux. Thereupon the reaction mixture was cooled down to 5° C. and the precipitate formed was filtered off, washed with 30 parts ethanol and dried at 60° C. in vacuo. 8.6 parts 2(1'-β-cyanoethyl-benzimidazolyl-(2')) - 5(4' - chlorophenyl)-furan were obtained which melted at 185–186° C. after recrystallisation from toluene.

EXAMPLE 9

Polyacrylonitrile fibres are treated in the manner described in Examples 1 or 8, but with the difference that instead of the benzimidazole compounds of the Formula I applied in these examples one of the following compounds (a) to (e) was used as brightening agent:

(a) 2(1'-methyl-benzimidazolyl-(2'))-5(4'-carbomethoxyphenyl)-furan of melting point 198.5–201.5° C.,
(b) 2(1'-methyl-benzimidazolyl-(2'))-5-4'-carbethoxyphenyl)-furan of melting point 167–168.5° C.,
(c) 2(1'-methyl-benzimidazolyl-(2'))-5(4'-chlorophenyl)-furan of melting point 200–201.5° C.,
(d) 2(1',5'-dimethyl-benzimidazolyl-(2'))-5(3',4'-dichlorophenyl)-furan of melting point 192° C., and
(e) 2(1',5'-dimethyl-benzimidazolyl-(2'))-5(4'-methylsulfonyl-phenyl)-furan of melting point 238–240° C.

A very good brightening effect is then likewise obtained. The compound (a) was prepared in the following manner:

46 parts 5(4'-carbomethoxy-phenyl)-furan-2-aldehyde (M.P. 148–150° C.) were heated to boiling under reflux for 10 minutes with 24.5 parts 1-amino-2-methylaminobenzene in 200 parts alcohol. Thereafter 140 parts nitrobenzene were added, the alcohol was distilled off, the temperature was raised up to the boiling point of nitrobenzene and the mixture was kept at this temperature for about 3 minutes. The reaction mixture was allowed to cool gradually and was then left to stand for several hours. The resultant precipitate was filtered off, washed with cold methanol and dried in vacuo at 80° C. The yield of 2(1'-methyl-benzimidazolyl - (2'))-5(4' - carbomethoxy-phenyl)-furan of melting point 198.5–201.5° C. (from alcohol/dimethylformamide) amounted to 41.8 parts.

The compounds (b) to (e) were prepared from the corresponding 5-aryl-furan-2-aldehydes and primary aryl amines in an analogous manner.

EXAMPLE 10

Polyacrylonitrile fibres are treated in the manner described in Example 2, but with the difference that instead of the benzimidazole compounds of the Formula II applied therein one of the following compounds (a) to (d) were used as brightening agent:

(a) 5(4'-carbomethoxyphenyl)-furan-2(1,3'-dimethyl-benzimidazolium-(2'))-methosulphate of melting point 261.5–264.5° C.,
(b) 5(4'-carbethoxyphenyl)-furan-2(1',3'-dimethyl-benzimidazolium-(2'))-methosulphate of melting point 223–225° C.,
(c) 5(3',4'-dichlorophenyl)-furan-2(1',3',5'-trimethyl-benzimidazolium-(2'))-methosulphate of melting point 164–166° C., and
(d) 5(4'-methylsulfonylphenyl)-furan-2(1',3',5'-trimethylbenzimidazolium-(2'))-methosulphate of melting point 223–226.5° C.

The brightening effects thus obtained are likewise very good. The compounds (a) to (d) were produced by reacting the compounds (a), (b), (d) and (e) listed in Example 9, with dimethyl sulphate in dioxan as indicated in Example 4.

EXAMPLE 11

Polyamide fibres are treated according to Example 6, but instead of the benzoxazole compound of the Formula I applied therein one of the following compounds is used as brightening agent:

(a) 2(5'-methyl-benzoxazolyl-(2'))-5(4'-methylsulfonyl-phenyl)-furan of melting point 224.5–225.5° C.,
(b) 2(5'-methyl-benzoxazolyl-(2'))-5(4'-acetamino-phenyl)-furan of melting point 255–256.5° C.

Likewise good brightening effects are thus obtained. The compound (a) was prepared in the following manner:

25 parts 5(4' - methylsulphonyl-phenyl)-furan-2-aldehyde (M.P. 157–158.5° C.) were heated to boiling under reflux for 15 minutes with 12.3 parts 1-amino-2-hydroxy-5-methylbenzene in 100 parts ethanol. The reaction mixture was then cooled, the crystalline precipitate was filtered off, washed with cold methanol and dried in vacuo. 25 parts of the resulting 27.5 parts of azomethine (M.P. 157–159° C.) were then stirred for 15 minutes with 31 parts lead tetracetate in 120 parts glacial acetic acid, while the mixture became warm. After cooling, the crystalline reaction product was filtered off, washed with cold methanol and dried in vacuo at 80° C. 20.5 parts 2(5'-methyl-benzoxazolyl - (2'))-5(4' - methylsulphonylphenyl)-furan were obtained which melted at 224.5–225.5° C. after recrystallisation from o-dichlorobenzene.

The compound (b) was prepared in the following manner:

44 parts 5(4'-nitrophenyl)-furan-2-aldehyde (M.P. 207–209° C.) were heated to boiling under reflux for 10 minutes with 25 parts 1-amino-2-hydroxy-5-methylbenzene in 200 parts ethanol. The reaction mixture was then cooled, and the separated crystalline product was filtered off, washed with cold methanol and dried in vacuo. 32 parts of the 56 parts azomethine (M.P. 175–177° C.) thus obtained were stirred for 15 minutes with 44 parts lead tetraacetate in 160 parts glacial acetic acid, while the mixture became warm. After cooling, the crystalline reaction product was filtered off, washed with cold methanol and dried in vacuo at 80° C. 3.2 parts of the 37 parts 2(5'-methyl-benzoxazolyl-(2')) - 5(4'-nitrophenyl)-furan (M.P. 198–200° C.) thus obtained were dissolved by heating under reflux in a mixture of 30 parts glacial acetic acid and 20 parts acetic anhydride. 10 parts powdered iron were then introduced during 15 minutes, whilst stirring. Thereafter the mixture was maintained at the boiling temperature under reflux for 1 hour, with stirring, and it was then filtered whilst hot. The residue on the filter was extracted by boiling with 10 parts glacial acetic acid, filtered whilst hot and washed with 10 parts of hot glacial acetic acid. The filtrates were combined and diluted with 150 parts water. After 1 hour the separated precipitate was filtered off with suction, washed with water and dried in vacuo at 80° C. 2.85 parts 2(5'-methyl-benzoxazolyl - (2'))-5(4' - acetaminophenyl)-furan were thus obtained which melted at 255–256.5° C. after recrystallisation from alcohol/dimethylformamide.

EXAMPLE 12

Polyester fibers are treated in the manner described in Example 5, but instead of the benzoxazole compounds of the Formula I applied therein one of the following compounds was used as brightening agent:

(a) 2(1'-methyl-benzimidazolyl-(2'))-5(4'-carbomethoxyphenyl)-furan of melting point 198.5–201.5° C.,
(b) 2(1',5'-dimethyl-benzimidazolyl-(2'))-5(4'-methylsulfonyl-phenyl)-furan of melting point 238-240° C.,
(c) 2(5'-methyl-benzoxazolyl-(2'))-5(4'-methylsulfonylphenyl)-furan of melting point 224.5–225.5° C.,
(d) 2(5'-methyl benzoxazolyl-(2'))-5(4'-carbomethoxyphenyl)-furan of melting point 178–179° C. and
(e) 2(5'-acetamino-benzoxazolyl-(2'))-5(3',4'-dichlorphenyl)-furan of melting point 252–253° C.

The preparation of the compounds (a) and (b) is described in Example 9, modes of procedures for the production of the compound (c) are indicated in Examples 3 and 11, the compound (d) was prepared from 5(4'-carbomethoxyphenyl)-furan-2-aldehyde and 1 - amino - 2-hydroxy-5-methylbenzene according to the method indicated in Example 11 for the compound (a) mentioned therein or according to the method described in the last paragraph of Example 5. The compound (e) was prepared in the following manner:

24.1 parts 5(3',4'-dichlorophenyl)-furan - 2 - aldehyde (M.P. 136–137° C.) were dissolved by heating under reflux in 80 parts tetrahydrofuran. A solution of 15.4 parts 1-amino-2-hydroxy-5-nitrobenzene in 60 parts hot tetrahydrofuran was added and the mixture subsequently maintained at its boiling temperature for 15 minutes whilst stirring. The solvent was then evaporated off, the residue was heated to boiling under reflux for 5 minutes with 100 parts ethanol, and the suspension was cooled. The resultant crystalline product was filtered off, washed with methanol and dried in vacuo at 80° C. 30 parts of the 32.4 parts azomethine (M.P. 233–235° C.) thus obtained were stirred for 15 minutes with 35 parts lead tetraacetate in 140 parts glacial acetic acid, while the mixture became warm. After cooling, the crystalline reaction product was filtered off, washed with cold methanol and dried in vacuo at 80° C. 28 parts 2(5-nitro-benzoxazolyl-(2')-5(3',4'-dichlorophenyl)-furan of melting point 226–228° C. were obtained. 25 parts of this compound were heated to boiling under reflux for 3 hours with 20 parts ammonium chloride and 40 parts zinc dust in a mixture of 450 parts ethanol and 50 parts water. The reaction mixture was filtered whilst hot, and the residue on the filter was extracted by boiling with 100 parts dimethylformamide and again filtered. The filtrates were combined and treated with 1000 parts water, whilst stirring, The resultant precipitate was filtered off, washed with water and dried in vacuo at 80° C. The crystalline product thus obtained (M.P. 305–309° C.) was stirred for 15 minutes with 90 parts acetic anhydride whilst the reaction vessel was cooled with cold water as soon as the mixture became warm. 120 parts methanol were then added whilst stirring and cooling. The crystalline precipitate was filtered off, washed with methanol and dried in vacuo at 80° C. 22 parts 2(5'-acetamino - benzoxazolyl-(2'))-5(3',4' - dichlorophenyl)-furan were obtained which melted at 252–253° C. after recrystallization from alcohol.

EXAMPLE 13

Fibres from cellulose acetate are moved at about 70° C. for 30 minutes at a liquor-to-goods ratio of 30:1 in an aqueous liquor which contains, per litre, 1 g. of a commercial surface-active paraffin-sulphonate and 0.06 g. 2(1'-methyl - benzimidazolyl-(2'))-5(4'-carbethoxyphenyl)-furan or 2(1',5' - dimethyl - benzimidazolyl - (2'))-5(3',4'-dichlorophenyl)-furan mentioned in Example 9, as brightening agent. Thereafter the fibres are rinsed and dried; they exhibit then a very good brightening effect.

Instead of one of the benzimidazole compounds used also 2(1'-methyl - benzimidazolyl-(2'))-5(4'-acetaminophenyl)-furan can be applied as optical brightening agent; this compound was obtained in the following manner:

44 parts 5(4'-nitrophenyl)-furan - 2 - aldehyde (M.P. 207–208° C.) were heated to boiling under reflux for 5 minutes with 25 parts 1-amino-2-methylamino-benzene in 160 parts alcohol. The reaction mixture was then cooled; the separated crystalline product was filtered off, washed with cold methanol and dried in vacuo. 40 parts of the 57 parts of azomethine (M.P. 226–228° C.) thus obtained were stirred for 15 minutes with 55 parts lead tetraacetate in 180 parts glacial acetic acid, while the mixture became somewhat warm. After cooling, the crystalline reaction product was filtered off, washed with cold methanol and dried in vacuo at 80° C. 33 parts 2(1'-methyl - benzimidazolyl-(2'))-5(4'-nitrophenyl)-furan of melting point 249–251° C. were obtained. The lead tetraacetate and glacial acetic acid could also be replaced by 140 parts of boiling nitrobenzene as the oxidising agent, using the method specified in Example 9. 26 parts of the resultant compound were then heated to boiling under reflux for 3 hours with 20 parts ammonium chloride and 40 parts zinc dust in a mixture of 450 parts alcohol and 50 parts water. Thereafter the reaction mixture was filtered whilst hot, and the residue on the filter was washed with 150 parts of hot alcohol. The filtrates were combined and treated with 600 parts water whilst stirring. The resultant crystalline precipitate was filtered off, washed with water and dried in vacuo at 80° C. 13 parts of the 25 parts 2(1'-methyl-benzimiadozlyl-(2'))-5(4'-aminophenyl)-furan (M.P. 187–189° C.) thus obtained were dissolved in 50 parts of hot acetic anhydride. The solution was then cooled, and the resultant precipitate was filtered off, washed with a little cold methanol and dried in vacuo at 80° C. 8 parts 2(1'-methyl-benzimidazolyl-(2'))-5(4'-acetamino - phenyl)-furan were thus obtained which melted at 233–235° C. after recrystallisation from alcohol.

EXAMPLE 14

Fibres from cellulose acetate are moved at about 80° C. for 25 minutes at a liquor-to-goods ratio of 30:1 in an aqueous liquor which contains per litre 0.06 g. (5(4'-chlorophenyl)-furan-2(1',3'-dimethyl - benzimidazolium-(2'))-methosulphate as brightening agent. Thereafter the fibres are rinsed and dried; they exhibit then a very good brightening effect.

The brightening agent applied was produced in the following manner:

According to the procedure described in Example 4 22.5 parts 5(4'-chlorophenyl)-furan-2-carboxylic acid were converted with 12.2 parts 1-amino-2-methylamino-benzene in a current of nitrogen in the presence of 0.5 part boric acid into 2(1' - methyl-benzimidazolyl-(2'))-5(4' - chlorophenyl)-furan of melting point 203–206° C. 10 parts of the 20.5 parts of the compound thus obtained were then quaternized with 4.5 parts dimethylsulphate in boiling dioxane in the manner likewise described in Example 4. 13 parts of 5(4'-chlorophenyl)-furan-2(1',3'-dimethyl-benzimidazolium-(2')) - methosulphate were obtained which melted at 186–192° C.

Instead of the above mentioned benzimidazol compound also the 5(4' - carbethoxyphenyl)-furan-2(1',3'-dimethyl-benzimidazolium-(2')) - methosulphate described in Example 10 can be applied as brightening agent.

EXAMPLE 15

65 parts of a polyvinyl chloride powder obtained by emulsion polymerisation, 35 parts of a commercial dioctyl phthalate as plasticizer, 2 parts of a commercial stannous laurate als stabilizer and 0.1 parts of 2(1'-methylbenzimidazolyl - (2')) - 5(4' - carbomethoxyphenyl)-furan or 2(1',5' - dimethyl-benzimidazolyl - (2')) - 5(4'-methylsulfonylphenyl)-furan as brightening agent are mixed with stirring to form a paste and subsequently made into a foil on a three-roll calender at 160–170° C. The foil is then brightened.

EXAMPLE 16

Fibres of cellulose triacetate are introduced at a liquor-to-goods ratio of 30:1 into an aqueous liquor which contains 1 g. of a commercial surface-active paraffin-sulfonate and 0.1 g. of 2(5'-methyl-benzoxazolyl-(2'))-5(4'-methylsulfonylphenyl)-furan mentioned in Example 11, as brightening agent. The liquor is then heated to 90–95° C. and kept at this temperature for 40 minutes. Thereafter the fibres are rinsed and dried; they are then brightened.

We claim:
1. A compound of the formula

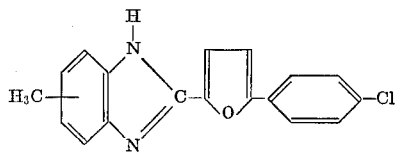

References Cited

UNITED STATES PATENTS

| | | | |
|---|---|---|---|
| 3,174,974 | 3/1965 | Siegrist et al. | 260—309.2 |
| 3,242,188 | 3/1966 | Siegrist et al. | 260—307.4 |
| 3,264,315 | 8/1966 | Maeder et al. | 260—307.4 |
| 3,328,310 | 6/1967 | Maeder et al. | 260—307.4 |
| 3,137,578 | 6/1964 | Selms | 260—309.2 |
| 3,174,974 | 3/1965 | Siegrist et al. | 260—309.2 |
| 3,242,188 | 3/1966 | Siegrist et al. | 260—307 |
| 3,264,315 | 8/1966 | Maeder et al. | 260—309.2 |

FOREIGN PATENTS

| | | |
|---|---|---|
| 102,189 | 7/1965 | Denmark. |

OTHER REFERENCES

Meyer German application 1,117,000, November 1961, (K1 71a 1/10), 2 pages spec.

NATALIE TROUSOF, Primary Examiner

U.S. Cl. X.R.

117—33.5; 252—301.2 W; 260—141, 240 G, 248 NS, 307 D, 308 B, 347.2, 347.3, 347.4, 347.7, 347.8